(12) United States Patent
Toyoda

(10) Patent No.: US 8,488,019 B2
(45) Date of Patent: Jul. 16, 2013

(54) IMAGE-CAPTURING DEVICE, IMAGE-CAPTURING METHOD AND STORAGE MEDIUM STORING IMAGE-CAPTURING PROGRAM FOR GENERATING A WIDE DYNAMIC RANGE IMAGE

(75) Inventor: Tetsuya Toyoda, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 286 days.

(21) Appl. No.: 12/970,450

(22) Filed: Dec. 16, 2010

(65) Prior Publication Data

US 2011/0176028 A1    Jul. 21, 2011

(30) Foreign Application Priority Data

Jan. 15, 2010    (JP) ................................. 2010-007137

(51) Int. Cl.
*H04N 5/235*    (2006.01)
(52) U.S. Cl.
USPC ...................................... 348/229.1; 348/362
(58) Field of Classification Search
USPC ................. 348/229.1, 274, 311, 362
See application file for complete search history.

(56) References Cited

U.S. PATENT DOCUMENTS

| | | | | |
|---|---|---|---|---|
| 2006/0250515 A1* | 11/2006 | Koseki et al. | ................. | 348/362 |
| 2007/0242148 A1* | 10/2007 | Kawai | ........................... | 348/311 |
| 2008/0252750 A1* | 10/2008 | Ogawa | ....................... | 348/229.1 |
| 2009/0051794 A1* | 2/2009 | Ando | ........................... | 348/274 |

FOREIGN PATENT DOCUMENTS

| | | |
|---|---|---|
| JP | 64-060156 | 3/1989 |
| JP | 2005-348221 | 12/2005 |
| JP | 2006-018571 | 1/2006 |
| JP | 2008-181196 | 8/2008 |

* cited by examiner

*Primary Examiner* — Gevell Selby
(74) *Attorney, Agent, or Firm* — Volpe and Koenig P.C.

(57) ABSTRACT

It is determined that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate. When a determination to widen the dynamic range is made, synthetic image data is generated by combining image data in a plurality of frames captured over varying exposure times. Then, the synthetic image data is displayed or recorded.

9 Claims, 13 Drawing Sheets

US 8,488,019 B2

IMAGE-CAPTURING DEVICE, IMAGE-CAPTURING METHOD AND STORAGE MEDIUM STORING IMAGE-CAPTURING PROGRAM FOR GENERATING A WIDE DYNAMIC RANGE IMAGE

FIELD OF THE INVENTION

This invention relates to a technology for generating an image with a wide dynamic range by combining a plurality of images captured with varying exposure quantities.

BACKGROUND OF THE INVENTION

There is a control method known in the related art, adopted to control an image-capturing device that may be set to a first mode in which a synthetic image is generated by combining a plurality of consecutively captured images with varying exposure quantities or a second mode in which images are captured by sustaining a given exposure time setting, whereby the first mode is selected when the extent of brightness variance within an image is significant (JP1-60156A).

SUMMARY OF THE INVENTION

An image-capturing device that generates a wide dynamic range image through image synthesis of an aspect of the present invention comprises an image-capturing unit that obtains image data by executing photoelectric conversion on a light flux received at an image sensor, a dynamic range widening determination unit that determines that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate, an exposure control unit that controls exposure at the image sensor based upon determination results indicating whether or not to widen the dynamic range, an image synthesis unit that generates synthetic image data by combining image data in a plurality of frames captured over varying exposure times when a determination to widen the dynamic range is made, and a processing unit that displays or records the synthetic image data.

An image-capturing method for generating a wide dynamic range image through image synthesis of another aspect of the present invention comprises a step of obtaining image data by executing photoelectric conversion on a light flux received at an image sensor, a step of determining that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate, a step of controlling exposure at the image sensor based upon determination results indicating whether or not to widen the dynamic range, a step of generating synthetic image data by combining image data in a plurality of frames captured over varying exposure times when a determination to widen the dynamic range is made, and a step of displaying or recording the synthetic image data.

A storage medium of yet another aspect of the present invention stores an image-capturing program for generating a wide dynamic range image through image synthesis. The image-capturing program causes a computer to execute a step of obtaining image data by executing photoelectric conversion on a light flux received at an image sensor, a step of determining that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate, a step of controlling exposure at the image sensor based upon determination results indicating whether or not to widen the dynamic range, a step of generating synthetic image data by combining image data in a plurality of frames captured over varying exposure times when a determination to widen the dynamic range is made, and a step of displaying or recording the synthetic image data.

DESCRIPTION OF THE PREFERRED EMBODIMENTS

Figure 1:
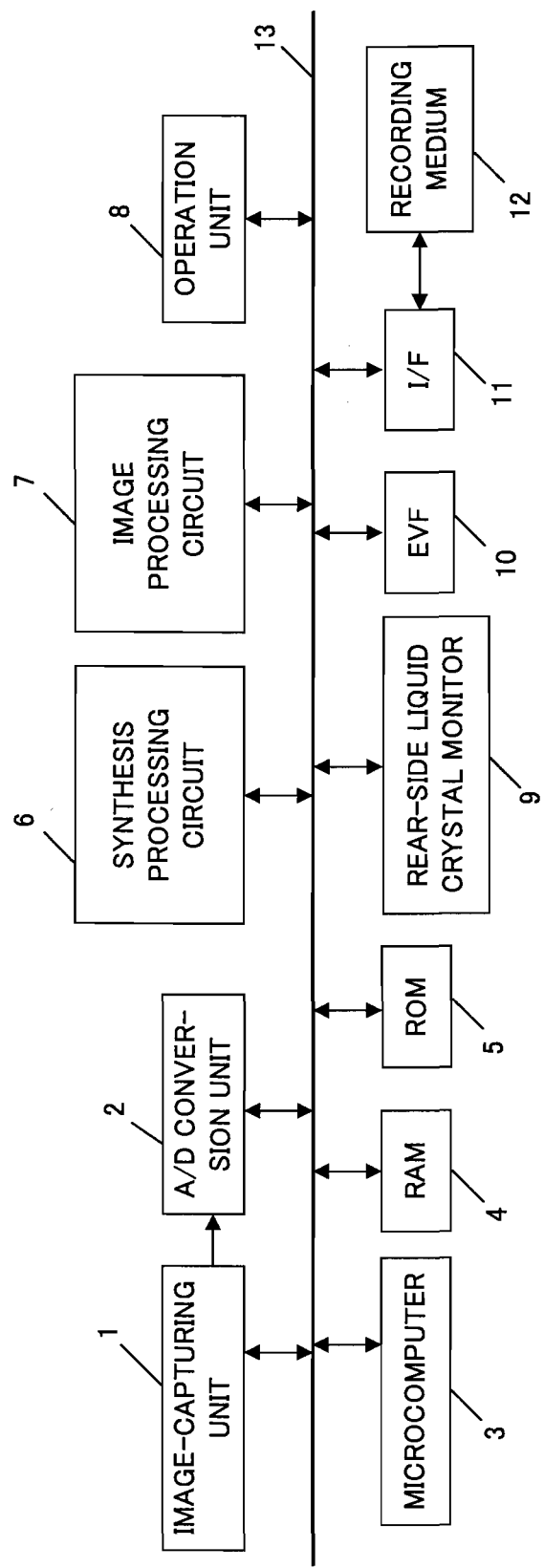
FIG. 1 is a block diagram showing the structure adopted in a digital camera achieved as an embodiment of an image-capturing device.

FIG. 1 is a block diagram showing the structure adopted in a digital camera achieved as an embodiment of the image-capturing device according to this invention. The digital camera comprises an image-capturing unit 1, an A/D conversion unit 2, a microcomputer 3, a RAM 4, a ROM 5, a synthesis processing circuit 6, an image processing circuit 7, an operation unit 8, a rear-side liquid crystal monitor 9, an electronic viewfinder (EVF) 10, a memory interface (hereafter referred to as an I/F) 11, a recording medium 12 and a bus 13.

The image-capturing unit 1 comprises a single-chip color image sensor (hereafter simply referred to as an image sensor)

with a plurality of color filters disposed at front surfaces of photodiodes each constituting a pixel, a photographic optical system, a drive unit engaged in drive of the image sensor and the photographic optical system, and the like. The color filters may be disposed in, for instance, a Bayer array. The Bayer array is formed by setting, along the horizontal direction, lines each made up with R pixels and G (Gr) pixels disposed at alternate positions and lines each made up with G (Gb) pixels and B pixels disposed at alternate positions and by alternately setting these two types of lines along the vertical direction as well. At the image sensor, light condensed via a lens (not shown) is received and undergoes photoelectric conversion at each of the photodiodes constituting the pixels. Thus, the quantity of light received at the photodiode is converted to an electrical charge quantity and the electrical charge quantity resulting from the conversion is output from the image sensor to the A/D conversion unit 2. It is to be noted that the image sensor may be a CMOS image sensor or a CCD image sensor. In addition, the color filters may assume an array other than the Bayer array and their colors are not limited to R, G and B.

The A/D conversion unit 2 converts the electrical signals output from the image-capturing unit 1 to digital image signals (hereafter referred to as image data).

The microcomputer 3 is a control unit that executes overall control of the digital camera. For instance, the microcomputer 3 executes focusing control for the photographic optical system and exposure control for the image sensor within the image-capturing unit 1, recording control under which image data are recorded into the recording medium 12, and display control under which image data are displayed at the rear-side liquid crystal monitor 9 and the EVF 10.

The RAM 4 is a storage unit in which various types of data, such as image data obtained via the A/D conversion unit 2 and image data having been processed at the synthesis processing circuit 6 and the image processing circuit 7, are temporarily stored. In the ROM 5, various parameters needed in the digital camera operation, a combination ratio table defining combination ratios with which a plurality of images are to be combined, and various programs executed by the microcomputer 3 are stored. The microcomputer 3 executes various types of processing by following instructions in the programs stored in the ROM 5 and also by reading parameters needed in specific sequences from the ROM 5.

The synthesis processing circuit 6 generates synthetic image data by combining a plurality of sets of image data. The embodiment is described by assuming that the synthesis processing circuit 6 generates a synthetic image with a wider dynamic range by combining two sets of image data expressing images captured with different exposure quantities.

Figure 2:
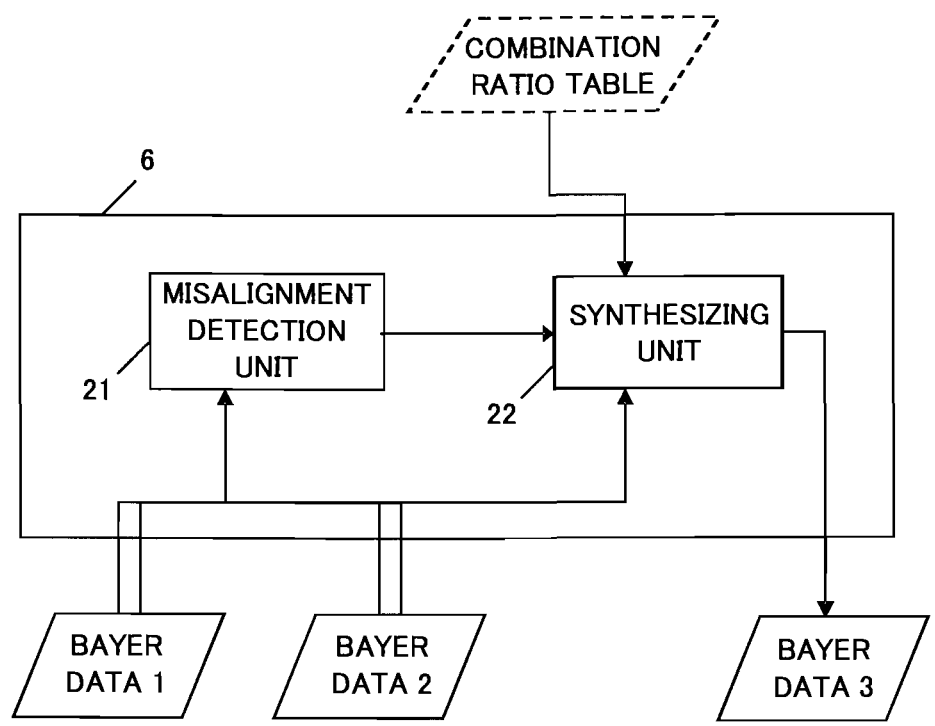
FIG. 2 is a detailed block diagram of the structure adopted in a synthesis processing circuit.

FIG. 2 is a detailed block diagram of the structure adopted in the synthesis processing circuit 6. The synthesis processing circuit 6 includes a misalignment detection unit 21 and a synthesizing unit 22.

The misalignment detection unit 21 detects an extent of misalignment between the two sets of image data to undergo the synthesis processing. In the example in FIG. 2, the two sets of image data to undergo the synthesis processing are Bayer Data 1 and Bayer Data 2 resulting from the A/D conversion executed at the A/D conversion unit 2 on image data sequentially read out from the individual pixels in the order of their positions in the Bayer array, which are input to the misalignment detection unit 21 via the bus 13. The extent of misalignment between the two sets of image data can be detected through a method of the known art.

The synthesizing unit 22 first corrects the misalignment between the two sets of image data based upon the extent of misalignment between the Bayer data 1 and the Bayer data 2 detected by the misalignment detection unit 21 and then generates synthetic image data by combining the two sets of image data. The synthetic image data thus generated are Bayer data 3 in the example in FIG. 2. The synthetic image data thus generated are transmitted via the bus 13 to the RAM 4 and are recorded into the RAM 4.

The image processing circuit 7 executes various types of image processing on image data read out from the RAM 4. The image processing executed at the image processing circuit 7 is to be described in further detail later. The image data having undergone the image processing at the image processing circuit 7 are recorded into the recording medium 12 via the I/F 11. While the recording medium 12 may be, for instance, a detachable memory card that can be loaded into and unloaded from the digital camera body, a recording medium other than such a memory card may be used.

The operation unit 8 includes operation members such as a power button, a shutter release button and various input keys. As a user operates a given operation member in the operation unit 8, the microcomputer 3 executes a sequence corresponding to the user operation. The power button is an operation member via which on/off instructions for turning the digital camera on/off are issued. In response to a depression of the power button, the microcomputer 3 turns power to the digital camera on or off. The shutter release button is constituted with a two-stage switch that includes a first shutter release switch and a second shutter release switch. As the shutter release button is pressed halfway down, thereby turning on the first shutter release switch, the microcomputer 3 executes photographing preparation sequences such as AE processing and AF processing. In addition, as the shutter release button is pressed all the way down and the second shutter release switch is turned on in response, the microcomputer 3 executes a photographing sequence to capture an image.

The bus 13 functions as a transfer path through which various types of data generated in the digital camera are transferred to various units within the digital camera. The bus 13 is connected to the image-capturing unit 1, the A/D conversion unit 2, the microcomputer 3, the RAM 4, the ROM 5, the synthesis processing circuit 6, the image processing circuit 7, the operation unit 8, the rear-side liquid crystal monitor 9, the EVF 10 and the I/F 11.

Figure 3:
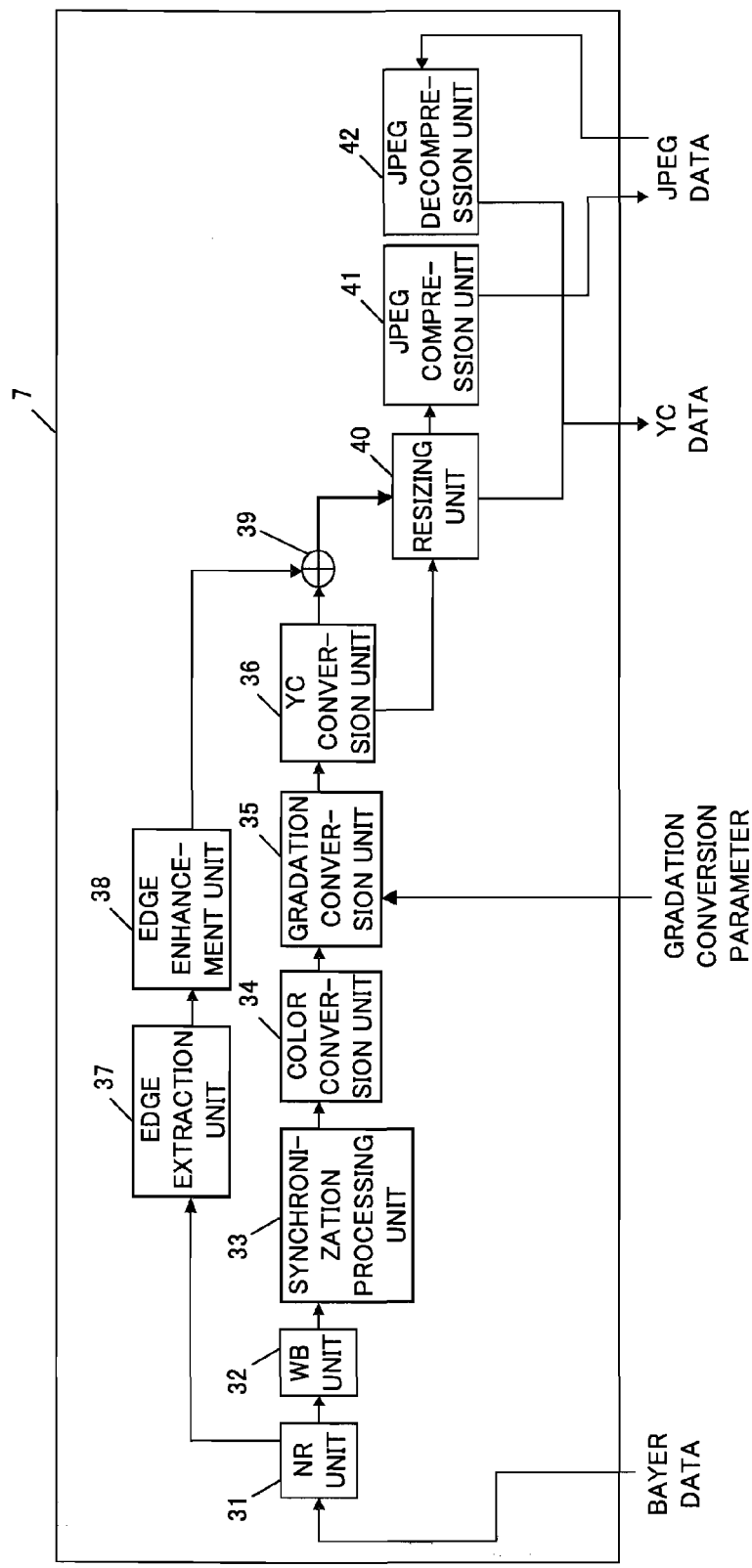
FIG. 3 is a detailed block diagram of the structure adopted in an image processing circuit.

FIG. 3 is a block diagram showing the structure adopted in the image processing circuit 7 in detail. The image processing circuit 7 includes a noise reducing unit (notated as an NR unit in the FIG. 31, a white balance correction unit (notated as a WB unit in the FIG. 32, a synchronization processing unit 33, a color conversion unit 34, a gradation conversion unit 35, a YC conversion unit 36, an edge extraction unit 37, an edge enhancement unit 38, an adding unit 39, a resizing unit 40, a JPEG compression unit 41 and a JPEG decompression unit 42.

The noise reducing unit 31 executes processing for reducing the noise in image data stored in the RAM 4. "The image data stored in the RAM 4" in this context refers to Bayer data constituted with synthetic image data if the synthesis processing has been executed by the synthesis processing circuit 6 but refers to Bayer data constituted with image data resulting from the conversion at the A/D conversion unit 2 if no synthesis processing has been executed. The noise reduction processing may include, for instance, processing for correcting pixel defects at the image sensor and processing for reducing random noise occurring during image-capturing operation. However, either the processing for correcting pixel defects at the image sensor or the processing for reducing random noise occurring during image-capturing operation alone may be executed, or another type of noise reduction processing may be executed.

The white balance correction unit 32 executes processing for correcting the white balance in the image data having undergone the noise reduction processing.

The synchronization processing unit 33 executes processing for synchronizing image data expressed with the pixels assuming the Bayer array so as to obtain image data providing R information, G information and B information in correspondence to each pixel. The synchronized image data then undergo a specific type of color conversion processing at the color conversion unit 34 and further undergo gradation conversion processing at the gradation conversion unit 35. The gradation conversion unit 35 executes gradation conversion processing optimal for the processing target image based upon the brightness distribution in the image.

The YC conversion unit 36 converts the image data resulting from the gradation conversion processing to Y (brightness) signals and C (color) signals. The Y signals resulting from the conversion are output to the adding unit 39, whereas the C signals are output to the resizing unit 40.

The edge extraction unit 37 executes processing for extracting edges from the image data having undergone the noise reduction processing at the noise reducing unit 31. The edge enhancement unit 38 executes edge enhancement processing by multiplying the edge data having been extracted by the edge extraction unit 37 by a predetermined gain.

The adding unit 39 adds the edge data output from the edge enhancement unit 38 to the Y signals output from the YC conversion unit 36.

The resizing unit 40 resizes the Y signals output from the adding unit 39 and the C signals output from the YC conversion unit 36 so as to adjust to a recording image size or a display image size. The JPEG compression unit 41 executes JPEG compression so as to compress the resized Y signals and C signals in the JPEG format. The data having undergone JPEG compression are transferred through the bus 13 and are recorded into the recording medium 12 via the I/F 11. The JPEG decompression unit 42 executes decompression processing on JPEG-compressed data recorded in the recording medium 12, which are input thereto via the bus 13, so as to convert the compressed data back to the pre-compression state.

Figure 4:
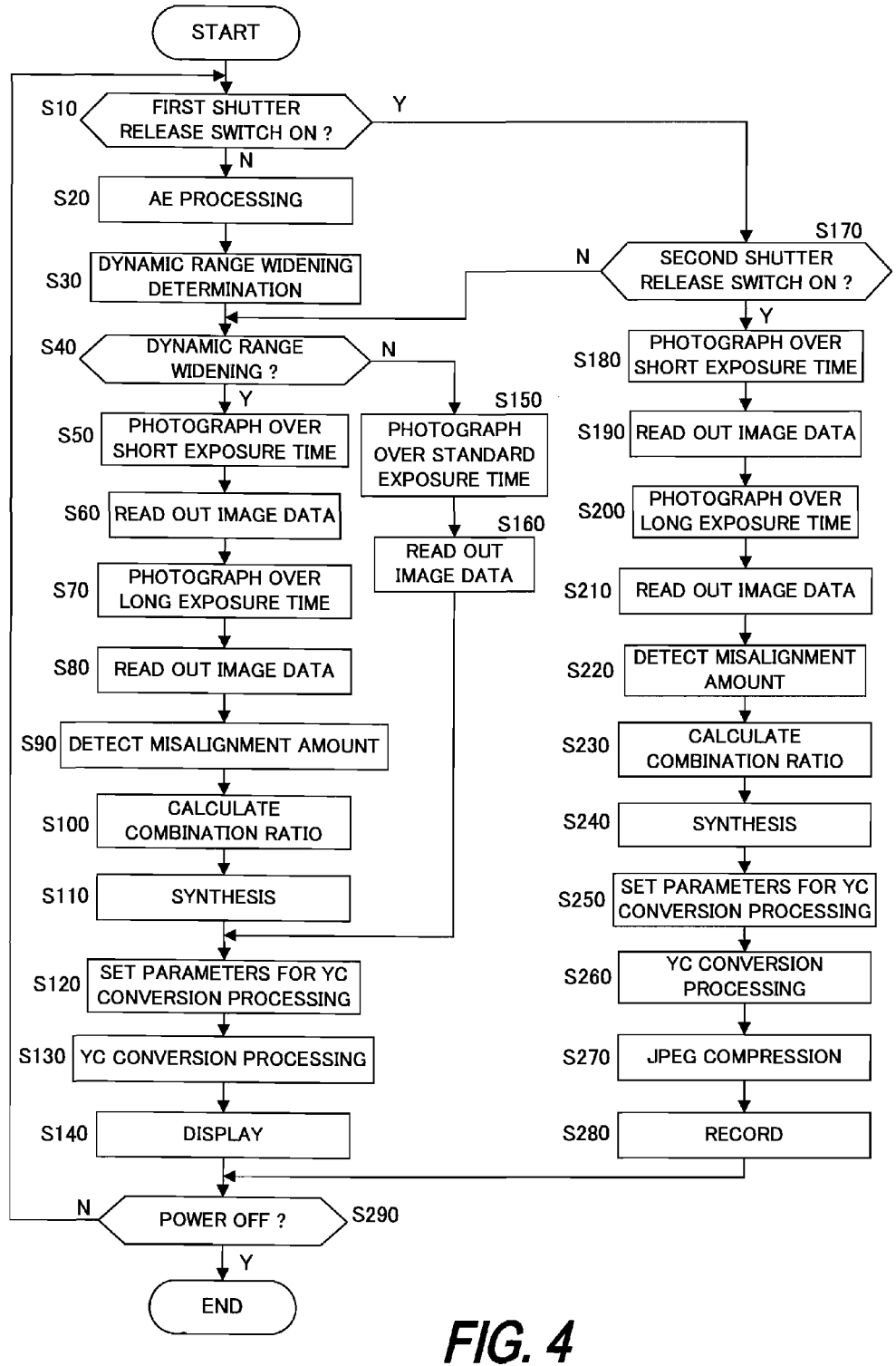
FIG. 4 is a flowchart of processing executed in the digital camera in the embodiment.

FIG. 4 is a flowchart of processing executed in the digital camera in an embodiment. As the user depresses the power button at the digital camera and power is turned on in response, the microcomputer 3 starts the processing in a step S10.

In the step S10, a determination is made as to whether or not the first shutter release switch has been turned on. If it is determined that the first shutter release switch has not been turned on, the operation proceeds to a step S20. In the step S20 and subsequent steps, processing for a so-called live view display is executed.

In the step S20, AE processing of the known art is executed in order to obtain an optimal exposure quantity for a photographing operation.

In a step S30, a determination is made based upon a subject lightness value having been ascertained through the AE processing executed in the step S20 as to whether or not to execute processing for increasing the dynamic range of images. A method of this determination is now described in reference to FIG. 5.

Figure 5:
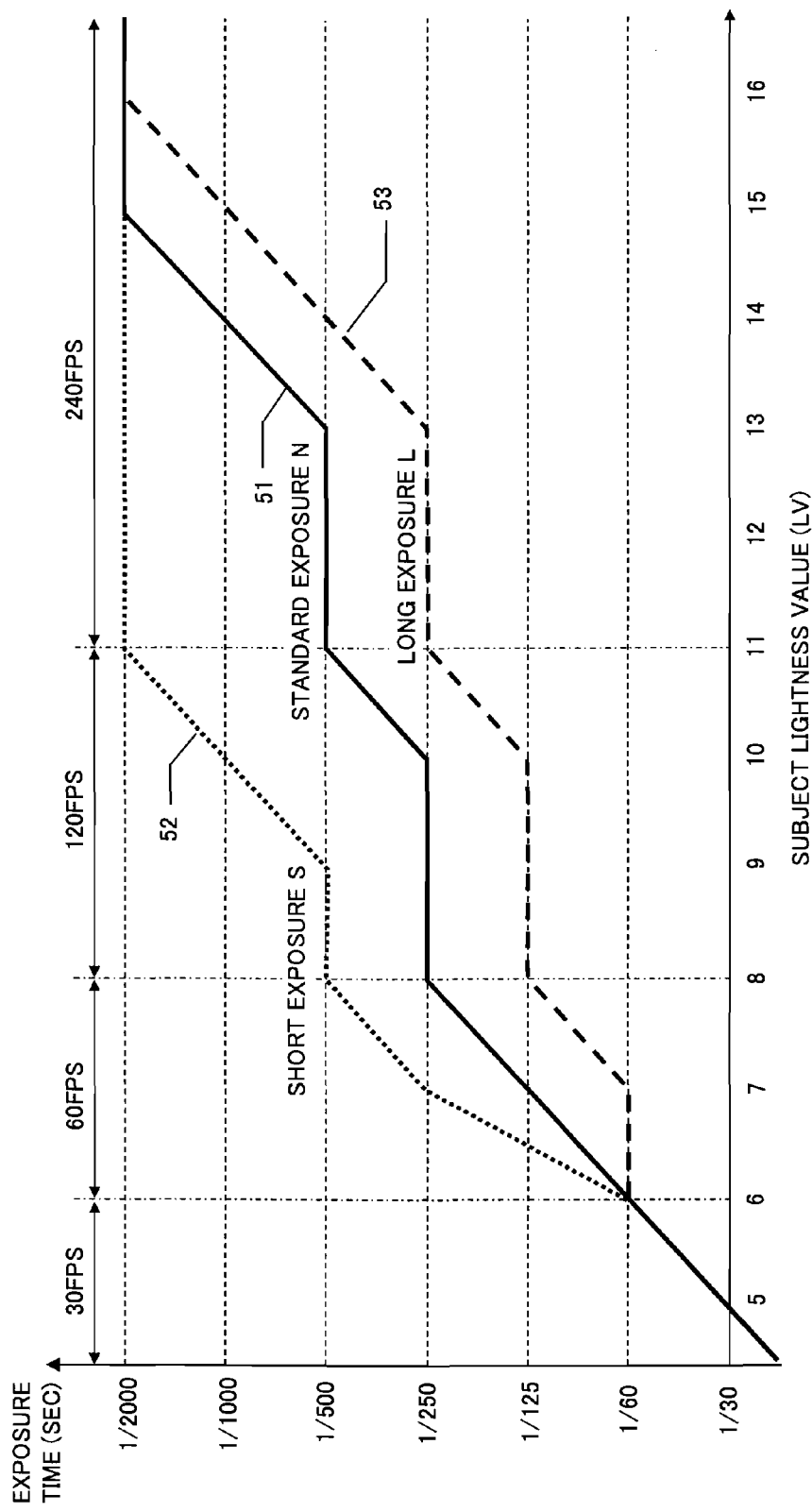
FIG. 5 is a program chart defining the relationship between the subject lightness value (LV) and the exposure time (sec).

FIG. 5 is a program chart defining the relationship between the subject lightness value (LV) and the exposure time (sec). It is to be noted that while the exposure time is determined by taking into consideration the aperture setting and the ISO sensitivity setting normally indicated as an ISO value, as well as the subject lightness value, the following description is given by assuming that the aperture and the ISO sensitivity are both fixed at predetermined values so as to simplify the explanation. A program chart defining the relationship between the subject lightness value and the exposure time, such as that shown in FIG. 5, is recorded in the ROM 5.

It is not unusual that an instruction manual, an instruction booklet or the like for a camera may indicate a numerical value different from the exposure time required in an actual photographing operation. For instance, when the exposure time indicated in the instruction manual is $1/125$ (sec), the actual exposure time will be $1/120$ (sec) which is the reciprocal of the image-capturing frame rate. Likewise, when the exposure time indicated in the instruction manual is $1/250$ (sec), the actual exposure time will be $1/240$ (sec) which is the reciprocal of the image-capturing frame rate. Accordingly, while numerical values are indicated in compliance with this customary practice in FIG. 5, the exposure time in the actual photographing operation will match the reciprocal of the image-capturing frame rate.

A solid line 51 represents an optimal standard exposure time corresponding to the subject lightness value. A dotted line 52 and a dotted line 53 respectively represent an exposure time set when an image is captured over a smaller exposure time than the standard exposure time and an exposure time set when an image is captured over a greater exposure time than the standard exposure time. As described later, processing for widening the dynamic range is executed when the subject lightness value is equal to or greater than LV6 and is equal to or less than a subject lightness value upper limit LV16 but the processing for widening the dynamic range is not executed if the subject lightness value is less than LV6 in this embodiment.

Accordingly, in the step S30 in FIG. 4, the determination as to whether or not to execute the processing for widening the dynamic range of images is made by ascertaining whether or not the subject lightness value is equal to or greater than LV6 and also equal to or less than LV16. The operation proceeds to a step S50 upon determining that the processing for widening the dynamic range is to be executed, whereas the operation proceeds to a step S150 upon determining that the processing for widening the dynamic range is not to be executed.

It is to be noted that when the aperture setting and the ISO sensitivity setting are fixed at predetermined values, as in FIG. 5, the frame rate for the video image, which may be a live view image, is determined in correspondence to the subject lightness value. Under normal circumstances, as the subject lightness takes a lower value, the aperture is opened wider and the ISO sensitivity is raised toward the upper limit. As the subject lightness value becomes even lower, the video frame rate, too, is lowered. As indicated in FIG. 5, a subject lightness value equal to or greater than LV6 corresponds to an image-capturing frame rate of 60 fps or higher. Thus, a determination may be made in the step S30 in FIG. 4 that the dynamic range is to be widened when the image-capturing frame rate is equal to or higher than 60 fps and the subject lightness value is equal to or less than LV16.

In the step S50, a photographing operation is executed over an exposure time set smaller than the standard exposure time corresponding to the subject lightness value. The length of the exposure time smaller than the standard exposure time can be determined by referencing the program chart in FIG. 5 based upon the subject lightness value having been ascertained through the AE processing in the step S20. For instance, an exposure time of 1/250 sec will be selected if the subject lightness value is LV7.

In a step S60, the image data obtained through the photographing operation executed in the step S50 are read out.

In a step S70, a photographing operation is executed over an exposure time set greater than the standard exposure time corresponding to the subject lightness value. The length of the exposure time greater than the standard exposure time can be determined by referencing the program chart in FIG. 5 based upon the subject lightness value having been ascertained through the AE processing in the step S20. For instance, an exposure time of 1/60 sec will be selected if the subject lightness value is LV7.

In a step S80, the image data obtained through the photographing operation executed in the step S70 are read out.

In a step S90, the extent of misalignment between the image data having been read out in the step S60 and the image data having been read out in the step S80 is detected. This processing is executed by the misalignment detection unit 21 within the synthesis processing circuit 6.

In a step S100, combination ratios at which the image data having been obtained with the shorter exposure time and the image data having been obtained with the longer exposure time are to be combined is calculated.

Figure 6:
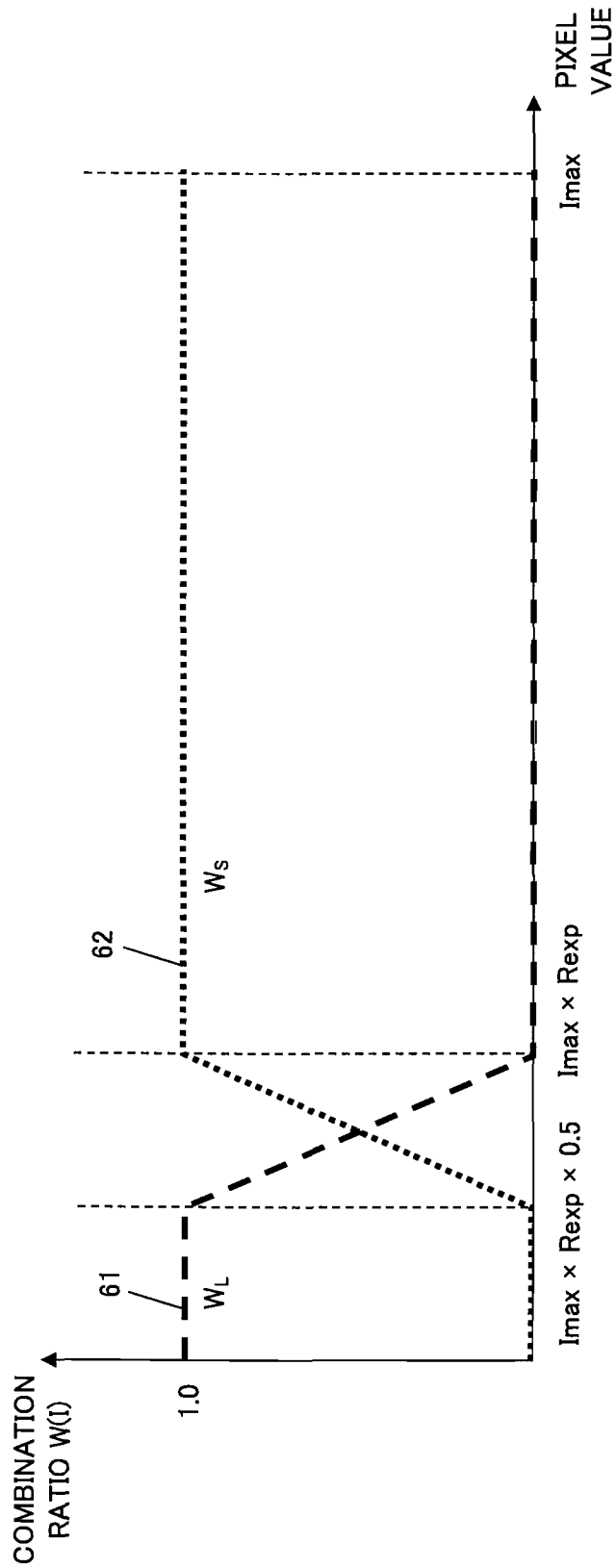
FIG. 6 presents an example of a relationship between a combination ratio $W_S$ at which the image data obtained with a shorter exposure are to be combined and a combination ratio $W_L$ at which the image data obtained with a longer exposure are to be combined.

FIG. 6 presents an example of a relationship between a combination ratio $W_S$ at which the image data obtained with the shorter exposure are to be combined and a combination ratio $W_L$ at which the image data obtained with the longer exposure are to be combined. A bold dotted line 61 represents the combination ratio $W_L$ at which the image data obtained with the longer exposure time are to be combined, whereas a fine dotted line 62 represents the combination ratio $W_S$ at which the image data obtained with the shorter exposure time are to be combined. In FIG. 6, $I_{max}$ indicates a maximum pixel value that can be taken as image data. In addition, with the exposure time longer than the standard exposure time notated as Exp(L) and the exposure time shorter than the standard exposure time notated as Exp(S), $R_{exp}$ can be expressed as in (1) below.

$$R_{exp}=\text{Exp}(S)/\text{Exp}(L) \quad (1)$$

As indicated in FIG. 6, the combination ratio $W_L$ is 1.0 as long as the pixel value remains equal to or less than $I_{max} \times R_{exp} \times 0.5$. Once the pixel value exceeds $I_{max} \times R_{exp} \times 0.5$, the combination ratio $W_L$ becomes less than 1.0. When the pixel value is equal to or greater than $I_{max} \times R_{exp}$, the combination ratio $W_L$ assumes a value of 0. The combination ratio $W_S$, which assumes a value of 0 as long as the pixel value remains equal to or less than $I_{max} \times R_{exp} \times 0.5$, gradually increases as the pixel value becomes increasingly greater than $I_{max} \times R_{exp} \times 0.5$, and assumes a value of 1.0 when the pixel value is equal to or greater than $I_{max} \times R_{exp}$. A combination ratio table defining a specific relationship between the pixel values and the combination ratios, such as that shown in FIG. 6, is stored in the ROM 5. Through pixel-for-pixel referencing of this combination ratio table, the combination ratio $W_S$ at which the image data obtained with the shorter exposure time are to be used to generate the synthetic image data, and the combination ratio $W_L$ at which the image data obtained with the longer exposure time are to be used to generate the synthetic image data, are calculated.

In a step S110, the misalignment between the image data having been read out in the step S60 and the image data having been read out in the step S80 is corrected based upon the extent of misalignment having been detected in the step S90, and once the misalignment between the images is corrected, processing for combining the images with the combination ratios having been calculated in the step S100 is executed. With $I_S(x, y)$ representing a pixel in the image data obtained with a shorter exposure time, $I_L(x, y)$ representing the corresponding pixel in the image data obtained with the longer exposure time, dx indicating an extent of misalignment between the two images along the x-coordinate axis and dy representing an extent of misalignment between the two images along the y-coordinate axis, a pixel $I_C(x, y)$ of the image generated by combining the two images is expressed as in (2) below. In the expression, $W_S(I_S(x, y))$ represents the combination ratio corresponding to the pixel $I_S(x, y)$ and $W_L(I_L(x+dx, y+dy))$ represents the combination ratio corresponding to the pixel $I_L(x+dx, y+dy)$ in the image data resulting from the misalignment correction.

$$I_C(x,y)=I_S(x,y) \times W_S(I_S(x,y))+I_L(x+dx,y+dy) \times W_L(I_L(x+dx,y+dy)) \times R_{exp} \quad (2)$$

The image data are combined as expressed in (2) pixel-by-pixel until the image data corresponding to all the pixels are combined. Then, before executing the processing in a subsequent step S120, the noise reduction processing, the white balance correction processing, the synchronization processing, the color conversion processing and the gradation conversion processing are executed respectively by the noise reducing unit 31, the white balance correction unit 32, the synchronization processing unit 33, the color conversion unit 34 and the gradation conversion unit 35.

The processing in the step S120 and a step S130 is executed by the YC conversion unit 36. In the step S120, the parameters needed for the YC conversion processing are set. In the step S130, the YC conversion processing is executed by using the parameters having been set in the step S120. Subsequently, the edge enhancement processing by the edge enhancement unit 38 and the resize processing by the resizing unit 40 are executed.

In a step S140, processing for displaying the image data that have undergone the resize processing, at the rear-side liquid crystal monitor 9 and the EVF 10 is executed.

In the step S150, a photographing operation is executed with the exposure time set to the standard length corresponding to the subject lightness value. The standard exposure time corresponding to the subject lightness value can be ascertained by referencing the program chart shown in FIG. 5.

In a step S160, the image data obtained through the photographing operation executed in the step S150 are read out. Then, the noise reduction processing, the white balance correction processing, the synchronization processing, the color conversion processing and the gradation conversion processing are executed respectively by the noise reducing unit 31, the white balance correction unit 32, the synchronization processing unit 33, the color conversion unit 34 and the gradation conversion unit 35.

If, on the other hand, it is determined in the step S10 that the shutter release button has been pressed halfway down by the user and the first shutter release switch has been turned on in response, the operation proceeds to a step S170. In the step S170, a determination is made as to whether or not the second shutter release switch has been turned on. The operation proceeds to a step S180 upon determining that the shutter release button has been pressed all the way down by the user and the second shutter release switch has been turned on in response. However, the operation proceeds to a step S40 if it is determined that the second shutter release switch has not been turned on.

In the step S180 and subsequent steps, still image photographing processing is executed. Since the processing executed in the step S180 through a step S260 is identical to the processing executed in the step S50 through the step S130, it is not described in detail.

In a step S270, the JPEG compression unit 41 executes JPEG compression for the Y signals and the C signals having been generated through the YC conversion processing. In a step S280, the data having undergone the JPEG compression are recorded into the recording medium 12 via the I/F 11.

In a step S290, a determination is made as to whether or not the power button of the digital camera has been depressed again and the power has been turned off in response. Upon determining that the power has not been turned off, the operation returns to the step S10 and the processing described above is repeatedly executed until the power is turned off. However, if it is determined that the power has been turned off, the processing in the flowchart ends.

Next, the timing with which images are captured and displayed is described in reference to various timing charts, each corresponding to a specific subject lightness value.

Figure 7:
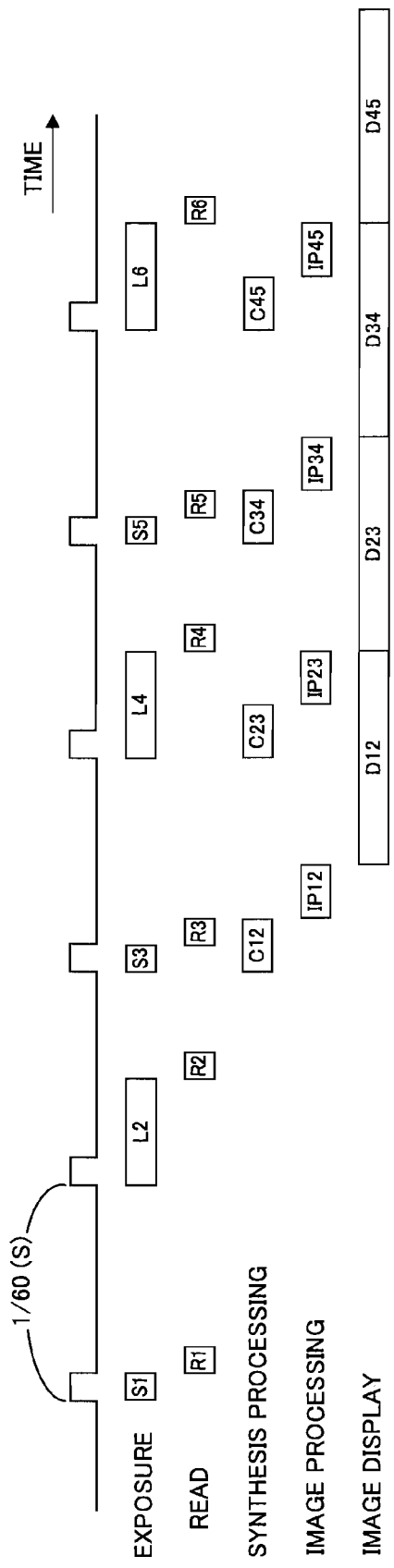
FIG. 7 is a timing chart corresponding to a subject lightness value of LV8.

FIG. 7 is a timing chart corresponding to a subject lightness value of LV8. As explained earlier, the frame rate of video including live view images is determined in correspondence to the subject lightness value. As FIG. 5 indicates, the video frame rate is 60 fps when the subject lightness value is LV8. In other words, images are captured with time intervals of 1/60 (sec), which is the reciprocal of the frame rate.

As the program chart in FIG. 5 indicates, the shorter exposure time is 1/500 (sec) and the longer exposure time is 1/125 (sec) when the subject lightness value is LV8. As shown in FIG. 7, a photographing operation (S1) is executed with the shorter exposure time and then the image data obtained through the photographing operation are read out (R1). Subsequently, 1/60 (sec) after the photographing operation with the shorter exposure time (S1), a photographing operation (L2) is executed with the longer exposure time and the image data obtained through the photographing operation are read out (R2).

After the two sets of image data having been read out are combined through the synthesis processing (C12) executed at the synthesis processing circuit 6, the combined image data undergo image processing (IP12) at the image processing circuit 7 and the image data resulting from the image processing are brought up on display (D12) at the rear-side liquid crystal monitor 9 and the EVF 10.

Subsequently, 1/60 (sec) after the photographing operation with the longer exposure time (L2), a photographing operation (S3) is executed with the shorter exposure time and the image data obtained through the photographing operation are read out (R3). After the image data having been read out through R2 and R3 are combined through synthesis processing (C23) executed at the synthesis processing unit 6, the combined image data undergo image processing (IP23) at the image processing circuit 7 and the image data resulting from the image processing are brought up on display (D23) at the rear-side liquid crystal monitor 9 and the EVF 10.

Subsequently, processing similar to that described above is repeatedly executed. Through this processing sequence, synthetic images with a wider dynamic range are displayed at the rear-side liquid crystal monitor 9 and the EVF 10.

Figure 8:
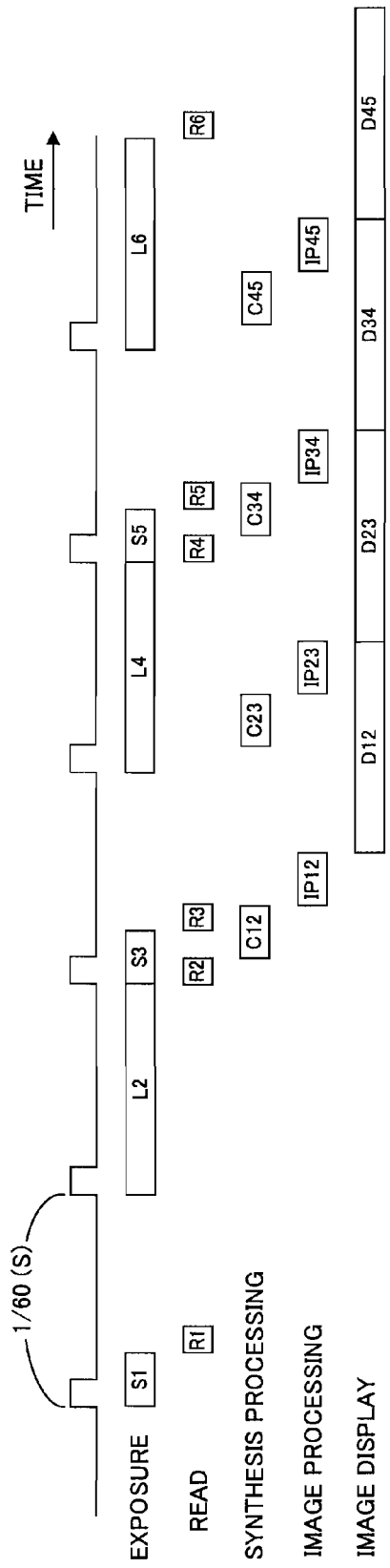
FIG. 8 is a timing chart corresponding to a subject lightness value of LV7.

FIG. 8 is a timing chart corresponding to a subject lightness value of LV7. As FIG. 5 indicates, the video frame rate is 60 fps when the subject lightness value is LV7. In other words, images are captured with time intervals of 1/60 (sec). In addition, as the program chart in FIG. 5 indicates, the shorter exposure time is 1/250 (sec) and the longer exposure time is 1/60 (sec).

In this situation, the longer exposure time matches the length of the image-capturing time intervals and thus, the photographing operation with the shorter exposure time will start as soon as the photographing operation with the longer exposure time ends. The timing with which the synthesis processing, the image processing and the image display processing are executed is identical to the timing indicated in the timing chart in FIG. 7.

Figure 9:
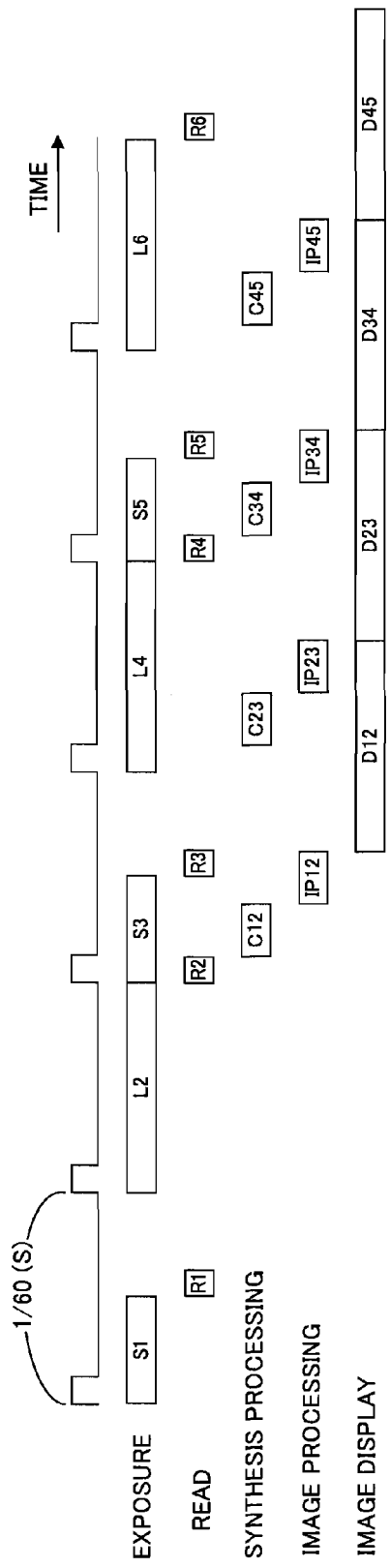
FIG. 9 is a timing chart corresponding to a subject lightness value of LV6.5.

FIG. 9 is a timing chart corresponding to a subject lightness value of LV6.5. As FIG. 5 indicates, the video frame rate is also 60 fps when the subject lightness value is LV6.5. In other words, images are captured with time intervals of 1/60 (sec). In addition, as the program chart in FIG. 5 indicates, the shorter exposure time is 1/125 (sec) and the longer exposure time is 1/60 (sec).

The standard exposure time lengthens as the subject lightness value decreases. This means that the longer exposure time, too, lengthens as the subject lightness value decreases. However, once the subject lightness value decreases to LV7, the longer exposure time becomes equal to the length of the image-capturing intervals, as indicated in FIG. 5. Accordingly, as long as the video frame rate is at 60 fps, the longer exposure time is sustained at 1/60 (sec) instead of increasing the longer exposure time, even if the subject lightness value becomes less than LV7. It is to be noted that the timing with which the synthesis processing, the image processing and the image display processing are executed is identical to the timing indicated in the timing charts in FIGS. 7 and 8.

Figure 10:
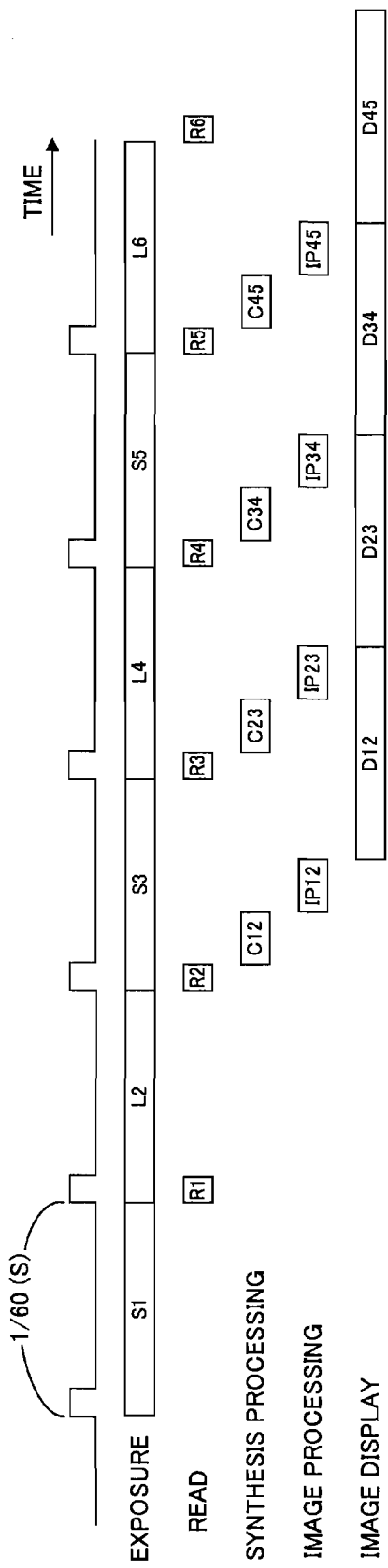
FIG. 10 is a timing chart corresponding to a subject lightness value of LV6.

FIG. 10 is a timing chart corresponding to a subject lightness value of LV6. It is assumed that the video frame rate is 60 fps when the subject lightness value is LV6. In other words, images are captured with time intervals of 1/60 (sec). In addition, as the program chart in FIG. 5 indicates, the shorter exposure time is 1/60 (sec) and the longer exposure time is 1/60 (sec).

The standard exposure time corresponding to the subject lightness value lengthens as the subject lightness value decreases, and the standard exposure time when the subject lightness value is lowered to LV6 is 1/60 (sec), which is the reciprocal of the image-capturing frame rate. Accordingly, while the subject lightness value remains in a range of LV7-LV6, the longer exposure time is sustained at 1/60 (sec), i.e. the reciprocal of the image-capturing frame rate. In addition, the shorter exposure time is controlled so as to assume a value of 1/60 (sec) in correspondence to the subject lightness value (LV6) at which the standard exposure time is equal to 1/60 (sec), i.e., the reciprocal of the image-capturing frame rate.

Under these circumstances, the dynamic range will not be widened even if the two images are combined, since the lengths of the shorter exposure time and the longer exposure time are the same.

Figure 11:
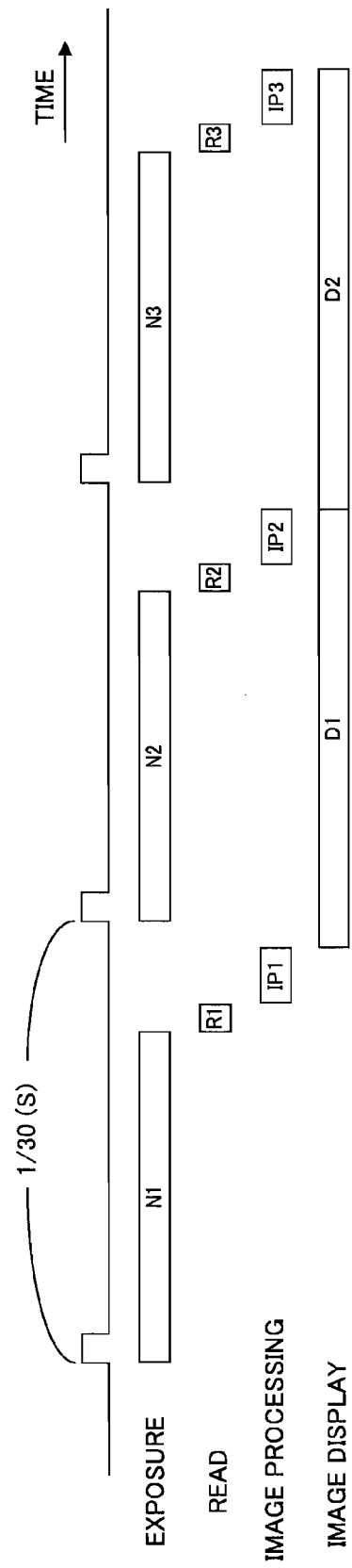
FIG. 11 is a timing chart corresponding to a subject lightness value of LV5.5.

FIG. 11 is a timing chart corresponding to a subject lightness value of LV5.5. As explained above, the lengths of the shorter exposure time and the longer exposure time become equal to each other once the subject lightness value decreases to LV6 in the program chart in FIG. 5. Accordingly, when the subject lightness value is less than LV6, a photographing operation is executed over the standard exposure time corresponding to the subject lightness value without executing the synthesis processing. A video image frame rate of 30 fps and 1/30 (sec) image-capturing time intervals will be assumed for this operation, as indicated in FIG. 5.

In this case, a photographing operation (N1) is executed with the standard exposure time and the image data obtained through the photographing operation are then read out (R1). The image data thus read out undergo image processing (IP1) at the image processing circuit 7 and the processed image data are brought up on display (D1) at the rear-side liquid crystal monitor 9 and the EVF 10. Subsequently, processing similar to that described above is repeatedly executed.

Figure 12:
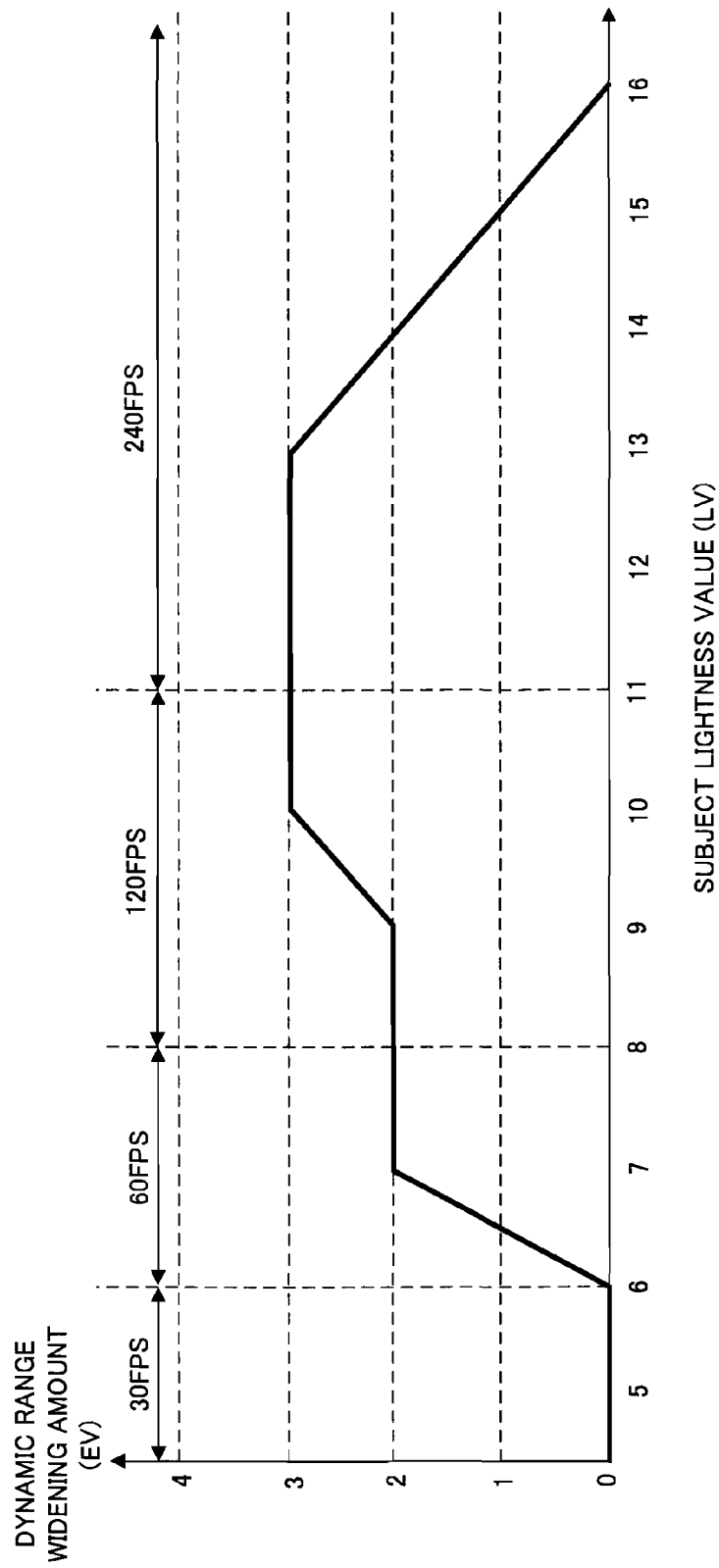
FIG. 12 shows a relationship between a subject lightness value and the extent by which a dynamic range is widened in a synthetic image.

FIG. 12 shows the relationship between the subject lightness value (LV; light value) and the extent by which the dynamic range is widened (EV; exposure value) in the synthetic image.

"LV" and "EV" used in this description are values expressed by adopting a method referred to as an apex system whereby they sustained a corresponding relationship so as to facilitate calculation of the exposure quantity. In addition, "the extent by which the dynamic range is increased in the synthetic image" refers to the extent by which the dynamic range is increased relative to the dynamic range of an image obtained by executing a photographing operation with the standard exposure.

For instance, as the program chart in FIG. 5 indicates, when the subject lightness value is LV8, the standard exposure time is 1/250 (sec), the shorter exposure time is 1/500 (sec) and the longer exposure time is 1/125 (sec). Thus, the extent by which the dynamic range widens is equivalent to an EV of 2 relative to the dynamic range achieved through the standard exposure.

As indicated in FIG. 12, the maximum extent by which the dynamic range of a synthetic image obtained with the image-capturing device in the embodiment can be widened relative to the dynamic range of an image obtained through a photographing operation executed over the standard exposure time is equivalent to an EV of 3. In addition, the dynamic range increases smoothly instead of suddenly, as the subject lightness value changes.

The image-capturing device achieved in the embodiment described above determines that the image dynamic range is to be widened when the subject lightness value is equal to or less than a lightness upper limit which is greater than a predetermined lightness value, provided that at least either of the following conditions exists; the subject lightness value is equal to or greater than the predetermined lightness value and the image-capturing frame rate is equal to or higher than a predetermined frame rate. Then, based upon the determination results indicating whether or not the dynamic range is to be widened, the exposure at the image sensor is controlled. If it has been determined that the dynamic range is to be widened, synthetic image data are generated by combining image data from a plurality of frames captured over varying exposure times. Through these measures, images with a wider dynamic range can be displayed or recorded while sustaining smoothness in the video image. Namely, since such synthetic images are not generated if the subject lightness value is less than the predetermined lightness value or if the image-capturing frame rate is lower than the predetermined frame rate, a smooth video image display can be provided without lowering the video image frame rate. In addition, images with wider dynamic ranges can be generated by combining image data from a plurality of frames captured over varying exposure time whenever the subject lightness value is equal to or lower than the lightness value upper limit provided that the subject lightness value is equal to or greater than the predetermined lightness value or that the image-capturing frame rate is equal to or higher than the predetermined frame rate.

Furthermore, image data are obtained by lengthening both the longer exposure time and the shorter exposure time as the subject lightness value decreases, and once the length of the longer exposure time matches a predetermined exposure time (the reciprocal of the image-capturing frame rate) determined in correspondence to the image-capturing frame rate, the longer exposure time is sustained at the predetermined exposure time, which is determined in correspondence to the image-capturing frame rate, even if the subject lightness value further decreases. As a result, images with wider dynamic ranges can be generated without lowering the image-capturing frame rate. Moreover, any abrupt change in the image quality can be prevented by disallowing a rapid change in the dynamic range while the subject lightness value decreases.

In addition, the optimal exposure time corresponding to the subject lightness value is lengthened as the subject lightness value decreases, while sustaining the longer exposure time at the predetermined exposure time determined in correspondence to the image-capturing frame rate until the optimal exposure time corresponding to the subject lightness value matches the predetermined exposure time (the reciprocal of the image-capturing frame rate) determined in correspondence to the image-capturing frame rate. Through these measures, an abrupt change in the image quality can be prevented by even more effectively disallowing a sudden change in the dynamic range while the subject lightness value decreases.

Furthermore, control is executed so as to lengthen the shorter exposure time as the subject lightness value decreases and to ensure that the shorter exposure time matches the predetermined exposure time determined in correspondence to the image-capturing frame rate at subject lightness value at which the optimal exposure time corresponding to the subject lightness value matches the predetermined exposure time determined in correspondence to the image-capturing frame rate. Through these measures, an abrupt change in the image quality can be prevented by even more effectively disallowing a sudden change in the dynamic range while the subject lightness value decreases.

In the above description of the embodiment, it is assumed that the processing performed by the image-capturing device is hardware processing, but this invention need not be limited to such a constitution. For example, a constitution in which the processing is performed by software may be employed. In this case, the image-capturing device includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image-capturing device described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the embodiment described above and allows for diverse variations and applications without departing from the scope of the invention. While the flow of the live view display processing has been described as a mode of video image display in reference to the flowchart in FIG. 4, video capturing•recording processing can be executed by following a substantially identical flow.

Figure 13:
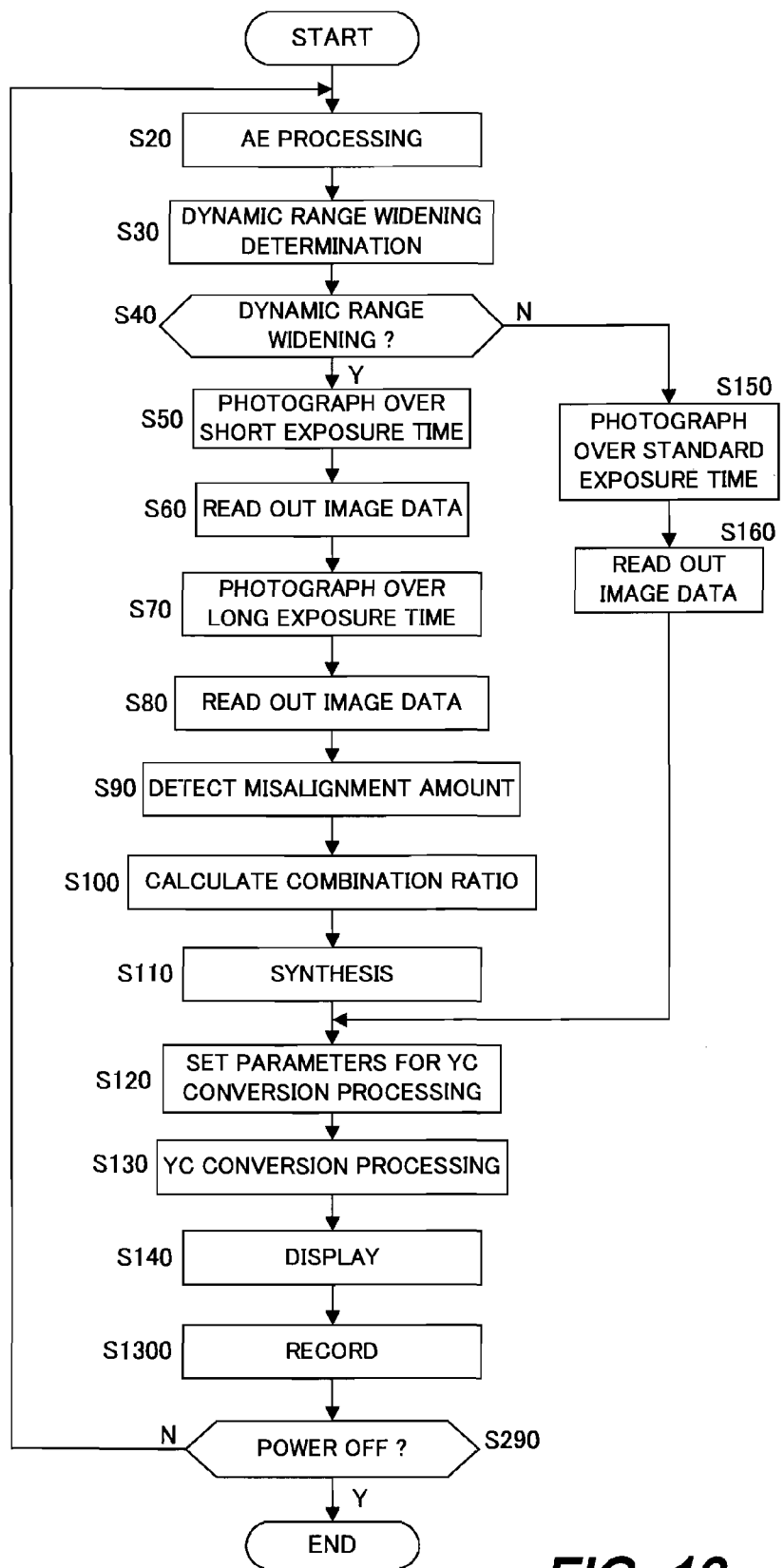
FIG. 13 is a flowchart of processing that may be executed in the digital camera in the embodiment when capturing a video image in a video shooting mode.

FIG. 13 is a flowchart of processing that may be executed in the digital camera in the embodiment when capturing a video image in a video shooting mode. The same step numbers are assigned to steps in which processing identical to the processing in the flowchart in FIG. 4 is executed so as to preclude the necessity for a detailed explanation thereof. The processing in a step S20 starts as the user presses a video shooting start button in the operation unit 8. The processing executed in the step S20 through a step S160 is identical to the corresponding processing in the flowchart in FIG. 4. Once the processing for displaying the image data at the rear-side liquid crystal monitor 9 and the EVF 10 is executed in the step S140, the operation proceeds to a step S1300. In the step S1300, the image data having undergone the processing executed through the step S140 are recorded into the recording medium 12 via the I/F 11.

This application claims priority based on JP2010-007137, filed with the Japan Patent Office on Jan. 15, 2010, the entire contents of which are incorporated into this specification by reference.

What is claimed is:

1. An image-capturing device that generates a wide dynamic range image through image synthesis, comprising:
   an image-capturing unit that obtains image data by executing photoelectric conversion on a light flux received at an image sensor;
   a dynamic range widening determination unit that determines that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate;
   an exposure control unit that controls exposure at the image sensor based upon determination results indicating whether or not to widen the dynamic range;
   an image synthesis unit that generates synthetic image data by combining image data in a plurality of frames captured over varying exposure times when a determination to widen the dynamic range is made; and
   a processing unit that displays or records the synthetic image data;
   wherein the exposure control unit lengthens both a long exposure time set for acquisition of long exposure image data and a short exposure time set for acquisition of short exposure image data as the subject lightness value decreases, and once the long exposure time set for acquisition of the long exposure image data matches a predetermined exposure time determined in correspondence to the image-capturing frame rate, the exposure control unit sustains the long exposure time set for acquisition of the long exposure image data at the predetermined exposure time determined in correspondence to the image-capturing frame rate even if the subject lightness value further decreases.

2. The image-capturing device as defined in claim 1, wherein:
   the exposure control unit lengthens an optimal exposure time corresponding to the subject lightness value as the subject lightness value decreases and sustains the long exposure time set for acquisition of the long exposure image data at the predetermined exposure time determined in correspondence to the image-capturing frame rate until the optimal exposure time matches the predetermined exposure time determined in correspondence to the image-capturing frame rate.

3. The image-capturing device as defined in claim 2, wherein:
   the exposure control unit executes control so as to lengthen the short exposure time set for acquisition of the short exposure image data as the subject lightness value decreases and to ensure that the short exposure time set for acquisition of the short exposure image data matches the predetermined exposure time determined in correspondence to the image-capturing frame rate at a subject lightness value at which the optimal exposure time matches the predetermined exposure time determined in correspondence to the image-capturing frame rate.

4. The image-capturing device as defined in claim 2, wherein:
   when lengthening the short exposure time set for acquisition of the short exposure image data in correspondence to the subject lightness value until the short exposure time set for acquisition of the short exposure image data matches the predetermined exposure time determined in correspondence to the image-capturing frame rate, the exposure control unit executes control so as to ensure that the short exposure time set for acquisition of the short exposure image data matches the long exposure time set for acquisition of the long exposure image data at a lightness value lower limit at which the dynamic range can still be widened.

5. The image-capturing device as defined in claim 2, wherein:
   the predetermined exposure time determined in correspondence to the image-capturing frame rate is equal to a reciprocal of the image-capturing frame rate.

6. The image-capturing device as defined in claim 2, further comprising:
   a combination ratio calculation unit that calculates a combination ratio with which the image data in the plurality of frames captured over the varying exposure times are combined, wherein:
   the image synthesis unit combines the image data in the plurality of frames based upon the combination ratio calculated by the combination ratio calculation unit.

7. The image-capturing device as defined in claim 5, further comprising:
   a combination ratio calculation unit that calculates a combination ratio with which the image data in the plurality of frames captured over the varying exposure times are combined, wherein:
   the image synthesis unit combines the image data in the plurality of frames based upon the combination ratio calculated by the combination ratio calculation unit.

8. An image-capturing method for generating a wide dynamic range image through image synthesis, comprising:
   a step of obtaining image data by executing photoelectric conversion on a light flux received at an image sensor;
   a step of determining that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate;
   a step of controlling exposure at the image sensor based upon determination results indicating whether or not to widen the dynamic range by lengthening both a long exposure time set for acquisition of long exposure image data and a short exposure time set for acquisition of short exposure image data as the subject lightness value decreases, and once the long exposure time set for acquisition of the long exposure image data matches a predetermined exposure time determined in correspondence to the image-capturing frame rate, the long exposure time set for acquisition of the long exposure image data is sustained at the predetermined exposure time determined in correspondence to the image-capturing frame rate even if the subject lightness value further decreases; and a step of generating synthetic image data by combining image data in a plurality of frames captured over varying exposure times when a determination to widen the dynamic range is made; and a step of displaying or recording the synthetic image data.

9. A storage medium storing an image-capturing program for generating a wide dynamic range image through image synthesis, wherein the image-capturing program causes a computer to execute:

a step of obtaining image data by executing photoelectric conversion on a light flux received at an image sensor;

a step of determining that a dynamic range of an image is to be widened when a subject lightness value is equal to or lower than a lightness value upper limit which is greater than a predetermined lightness value provided that at least either the subject lightness value is equal to or greater than the predetermined lightness value or that an image-capturing frame rate is equal to or higher than a predetermined frame rate;

a step of controlling exposure at the image sensor based upon determination results indicating whether or not to widen the dynamic range by lengthening both a long exposure time set for acquisition of long exposure image data and a short exposure time set for acquisition of short exposure image data as the subject lightness value decreases, and once the long exposure time set for acquisition of the long exposure image data matches a predetermined exposure time determined in correspondence to the image-capturing frame rate, the long exposure time set for acquisition of the long exposure image data is sustained at the predetermined exposure time determined in correspondence to the image-capturing frame rate even if the subject lightness value further decreases;

a step of generating synthetic image data by combining image data in a plurality of frames captured over varying exposure times when a determination to widen the dynamic range is made; and a step of displaying or recording the synthetic image data.

* * * * *